(12) United States Patent
John et al.

(10) Patent No.: US 11,988,598 B2
(45) Date of Patent: May 21, 2024

(54) OPTICAL CELL CLEANER

(71) Applicant: SeekOps Inc., Austin, TX (US)

(72) Inventors: Garrett Niall John, Buda, TX (US); Iain Cooper, Canyon Lake, TX (US); Andrew David Aubrey, Austin, TX (US)

(73) Assignee: SEEKOPS INC., Austin, TX (US)

( * ) Notice: Subject to any disclaimer, the term of this patent is extended or adjusted under 35 U.S.C. 154(b) by 691 days.

(21) Appl. No.: 17/137,313

(22) Filed: Dec. 29, 2020

(65) Prior Publication Data

US 2021/0199565 A1    Jul. 1, 2021

Related U.S. Application Data

(60) Provisional application No. 62/955,536, filed on Dec. 31, 2019.

(51) Int. Cl.
| | | |
|---|---|---|
| *G01N 21/15* | (2006.01) | |
| *G01J 3/02* | (2006.01) | |
| *G01J 3/42* | (2006.01) | |
| *G01N 21/03* | (2006.01) | |
| *G01N 21/31* | (2006.01) | |

(52) U.S. Cl.
CPC ............ *G01N 21/15* (2013.01); *G01J 3/0291* (2013.01); *G01J 3/42* (2013.01); *G01N 21/031* (2013.01); *G01N 21/31* (2013.01)

(58) Field of Classification Search
CPC ...... G01N 21/15; G01N 21/031; G01N 21/31; G01J 3/0291; G01J 3/42
See application file for complete search history.

(56) References Cited

U.S. PATENT DOCUMENTS

| | | |
|---|---|---|
| 3,780,566 A | 12/1973 | Smith et al. |
| 4,135,092 A | 1/1979 | Milly |
| 4,233,564 A | 11/1980 | Kerbel |
| (Continued) | | |

FOREIGN PATENT DOCUMENTS

| | | | | |
|---|---|---|---|---|
| AU | 3401499 A | 11/1999 | | |
| CN | 104458588 A | * 3/2015 | ............. | G01N 21/17 |
| (Continued) | | | | |

OTHER PUBLICATIONS

International Search Report and Written Opinion for PCT/US22/38951, mailed Nov. 28, 2022.

(Continued)

*Primary Examiner* — Jamil Ahmed
(74) *Attorney, Agent, or Firm* — Concept IP LLP; Michael Zarrabian (57) ABSTRACT

Systems, devices, and methods for an optical head enclosure of a sensor; one or more imbedded nozzles disposed on a surface of the optical head enclosure; an inlet of the one or more imbedded nozzles, where the inlet comprises a nozzle channel for receiving a cleaning solution; a flow channel internal to the optical head enclosure, where the nozzle channel is connected to the flow channel, and where the flow channel comprises an outlet for dispersing the cleaning solution received from the nozzle channel; wherein the inlet comprises a break to stop a nozzle of a cleaning device from reaching a mirror of the sensor; where the outlet directs the cleaning solution from the inlet onto the mirror.

20 Claims, 9 Drawing Sheets

(56) References Cited

U.S. PATENT DOCUMENTS

| | | |
|---|---|---|
| 4,507,558 A | 3/1985 | Bonne |
| 4,988,833 A | 1/1991 | Lai |
| 5,047,639 A | 9/1991 | Wong |
| 5,075,619 A | 12/1991 | Said |
| 5,173,749 A | 12/1992 | Tell et al. |
| 5,291,265 A | 3/1994 | Kebabian |
| 5,317,156 A | 5/1994 | Cooper et al. |
| 5,822,058 A | 10/1998 | Adler-Golden et al. |
| 6,064,488 A | 5/2000 | Brand et al. |
| 6,509,566 B1 | 1/2003 | Wamsley et al. |
| 6,549,630 B1 | 4/2003 | Bobisuthi |
| 7,800,751 B1 | 9/2010 | Silver et al. |
| 7,833,480 B2 | 11/2010 | Blazewicz et al. |
| 8,294,899 B2 | 10/2012 | Wong |
| 8,451,120 B2 | 5/2013 | Johnson, Jr. et al. |
| 8,730,461 B2 | 5/2014 | Andreussi |
| 9,183,371 B2 | 11/2015 | Narendra et al. |
| 9,183,731 B1 | 11/2015 | Bokhary |
| 9,235,974 B2 | 1/2016 | Johnson, Jr. et al. |
| 9,250,175 B1 | 2/2016 | McManus |
| 9,494,511 B2 | 11/2016 | Wilkins |
| 9,599,529 B1 | 3/2017 | Steele et al. |
| 9,599,597 B1 | 3/2017 | Steele et al. |
| 10,023,311 B2 | 7/2018 | Lai et al. |
| 10,023,323 B1 | 7/2018 | Roberts et al. |
| 10,126,200 B1 | 11/2018 | Steele et al. |
| 10,268,198 B2 | 4/2019 | Mantripragada et al. |
| 10,325,485 B1 | 6/2019 | Schuster |
| 10,365,646 B1 | 7/2019 | Farnsworth et al. |
| 10,429,546 B1 | 10/2019 | Ulmer |
| 10,830,034 B2 | 11/2020 | Cooley et al. |
| 10,962,437 B1 | 3/2021 | Nottrott et al. |
| 11,299,268 B2 | 4/2022 | Christensen et al. |
| 11,519,855 B2 | 12/2022 | Black et al. |
| 2002/0005955 A1 | 1/2002 | Kramer et al. |
| 2003/0160174 A1 | 8/2003 | Grant et al. |
| 2003/0189711 A1 | 10/2003 | Orr et al. |
| 2003/0230716 A1 | 12/2003 | Russell et al. |
| 2004/0012787 A1 | 1/2004 | Galle et al. |
| 2004/0017762 A1 | 1/2004 | Sogawa et al. |
| 2004/0212804 A1 | 10/2004 | Neff et al. |
| 2006/0015290 A1 | 1/2006 | Warburton et al. |
| 2006/0044562 A1 | 3/2006 | Hagene et al. |
| 2006/0232772 A1 | 10/2006 | Silver |
| 2006/0234621 A1 | 10/2006 | Desrochers et al. |
| 2007/0137318 A1 | 6/2007 | Desrochers et al. |
| 2008/0169934 A1 | 7/2008 | Lang et al. |
| 2008/0243372 A1 | 10/2008 | Bodin et al. |
| 2009/0201507 A1 | 8/2009 | Kluczynski et al. |
| 2009/0263286 A1 | 10/2009 | Isomura et al. |
| 2009/0326792 A1 | 12/2009 | McGrath |
| 2010/0004798 A1 | 1/2010 | Bodin et al. |
| 2010/0131207 A1 | 5/2010 | Lippert et al. |
| 2010/0140478 A1 | 6/2010 | Wilson et al. |
| 2010/0147081 A1 | 6/2010 | Thomas |
| 2011/0074476 A1 | 3/2011 | Heer et al. |
| 2011/0150035 A1 | 6/2011 | Hanson et al. |
| 2011/0164251 A1 | 7/2011 | Richter |
| 2011/0242659 A1* | 10/2011 | Eckles .............. G01N 33/0047 359/507 |
| 2011/0257944 A1 | 10/2011 | Du et al. |
| 2012/0120397 A1 | 5/2012 | Furtaw et al. |
| 2013/0044314 A1 | 2/2013 | Koulikov et al. |
| 2013/0076900 A1 | 3/2013 | Mrozek et al. |
| 2013/0208262 A1 | 8/2013 | Andreussi |
| 2014/0172323 A1 | 6/2014 | Marino |
| 2014/0204382 A1 | 7/2014 | Christensen |
| 2014/0236390 A1 | 11/2014 | Mohamadi |
| 2014/0336957 A1 | 11/2014 | Hanson et al. |
| 2015/0072633 A1 | 3/2015 | Massarella et al. |
| 2015/0275114 A1 | 10/2015 | Tumiatti et al. |
| 2015/0295543 A1 | 10/2015 | Brown et al. |
| 2015/0316473 A1 | 11/2015 | Kester et al. |
| 2016/0018373 A1 | 1/2016 | Pagé et al. |
| 2016/0104250 A1 | 4/2016 | Allen et al. |
| 2016/0146696 A1 | 5/2016 | Steele et al. |
| 2016/0161456 A1 | 6/2016 | Risk et al. |
| 2016/0202225 A1 | 7/2016 | Feng et al. |
| 2016/0214715 A1 | 7/2016 | Meffert |
| 2016/0307447 A1 | 10/2016 | Johnson et al. |
| 2016/0357192 A1 | 12/2016 | McGrew et al. |
| 2017/0003684 A1 | 1/2017 | Knudsen et al. |
| 2017/0057081 A1 | 3/2017 | Krohne et al. |
| 2017/0089829 A1 | 3/2017 | Bartholomew et al. |
| 2017/0093122 A1 | 3/2017 | Bean et al. |
| 2017/0097274 A1 | 4/2017 | Thorpe et al. |
| 2017/0115218 A1 | 4/2017 | Huang et al. |
| 2017/0134497 A1 | 5/2017 | Harter et al. |
| 2017/0158353 A1 | 6/2017 | Schmick |
| 2017/0199647 A1 | 7/2017 | Richman et al. |
| 2017/0206648 A1 | 7/2017 | Marra et al. |
| 2017/0235018 A1 | 8/2017 | Foster et al. |
| 2017/0259920 A1 | 9/2017 | Lai et al. |
| 2017/0307519 A1 | 10/2017 | Black et al. |
| 2017/0336281 A1 | 11/2017 | Waxman et al. |
| 2017/0339820 A1 | 11/2017 | Foster et al. |
| 2018/0023974 A1 | 1/2018 | Otani et al. |
| 2018/0045561 A1 | 2/2018 | Leen et al. |
| 2018/0045596 A1 | 2/2018 | Prasad et al. |
| 2018/0050798 A1 | 2/2018 | Kapuria |
| 2018/0059003 A1 | 3/2018 | Jourdainne et al. |
| 2018/0067066 A1 | 3/2018 | Giedd et al. |
| 2018/0109767 A1 | 4/2018 | Li et al. |
| 2018/0127093 A1 | 5/2018 | Christensen et al. |
| 2018/0188129 A1 | 7/2018 | Choudhury et al. |
| 2018/0259955 A1 | 9/2018 | Noto |
| 2018/0266241 A1 | 9/2018 | Ferguson et al. |
| 2018/0266946 A1 | 9/2018 | Kotidis et al. |
| 2018/0209902 A1 | 10/2018 | Myshak et al. |
| 2018/0284088 A1 | 10/2018 | Verbeck, IV |
| 2018/0292374 A1 | 10/2018 | Dittberner et al. |
| 2018/0321692 A1 | 11/2018 | Castillo-Effen et al. |
| 2018/0322699 A1 | 11/2018 | Gray et al. |
| 2019/0011920 A1 | 1/2019 | Heinonen et al. |
| 2019/0011935 A1 | 1/2019 | Ham et al. |
| 2019/0025199 A1 | 1/2019 | Koulikov |
| 2019/0033194 A1 | 1/2019 | DeFreez et al. |
| 2019/0049364 A1 | 2/2019 | Rubin |
| 2019/0077506 A1 | 3/2019 | Shaw et al. |
| 2019/0086202 A1 | 3/2019 | Guan et al. |
| 2019/0095687 A1 | 3/2019 | Shaw et al. |
| 2019/0154874 A1 | 5/2019 | Shams et al. |
| 2019/0178743 A1 | 6/2019 | Mcneil |
| 2019/0195789 A1 | 6/2019 | Pan et al. |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1 | 8/2019 | Tanomura et al. |
| 2019/0331652 A1 | 10/2019 | Ba et al. |
| 2020/0109976 A1 | 4/2020 | Ajay et al. |
| 2020/0249092 A1 | 8/2020 | Podmore et al. |
| 2020/0400635 A1 | 12/2020 | Potyrailo et al. |
| 2021/0017926 A1 | 1/2021 | Alkadi et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0247369 A1 | 8/2021 | Nottrott et al. |
| 2021/0255158 A1 | 8/2021 | Smith et al. |
| 2021/0300591 A1 | 9/2021 | Tian |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0113290 A1 | 4/2022 | Smith et al. |
| 2022/0268952 A1 | 8/2022 | Liang et al. |
| 2022/0341806 A1 | 10/2022 | Miller et al. |
| 2023/0194487 A1 | 6/2023 | Buckingham et al. |

FOREIGN PATENT DOCUMENTS

| | | |
|---|---|---|
| CN | 205749271 U | 11/2016 |
| CN | 106769977 A | 5/2017 |
| CN | 107703075 A | 2/2018 |

(56) References Cited

FOREIGN PATENT DOCUMENTS

| CN | 109780452 A | 5/2019 |
|---|---|---|
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 1371962 B1 | 7/2011 |
| FR | 3047073 B1 | 8/2019 |
| GB | 2538563 A | 11/2016 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020086499 A1 | 4/2020 |
| WO | 2020206006 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.
Krings et al., Atmos. Meas. Tech., 11, 721-739, Feb. 7, 2018.
Lilian Joly, The evolution of AMULSE (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).
International Search Report and Written Opinion for PCT/US23/13893, mailed Jun. 30, 2023.
U.S. Appl. No. 62/687,147, filed Jun. 19, 2018, Brendan James Smith.
International Search Report and Written Opinion for PCT/US19/38011 mailed Sep. 9, 2019.
International Search Report and Written Opinion for PCT/US19/38015, mailed Oct. 18, 2019.
International Search Report and Written Opinion for PCT/US19/44119, mailed Oct. 17, 2019.
International Search Report and Written Opinion for PCT/US20/26228 mailed Jul. 1, 2020.
International Search Report and Written Opinion for PCT/US20/26232 mailed Jun. 26, 2020.
International Search Report and Written Opinion for PCT/US20/26246 mailed Jun. 29, 2020.
International Search Report and Written Opinion for PCT/US20/51696, mailed Feb. 3, 2021.
International Search Report and Written Opinion for PCT/US2020/044978, mailed Oct. 26, 2020.
International Search Report and Written Opinion for PCT/US2021/016821 mailed Apr. 26, 2021.
International Search Report and Written Opinion for PCT/US2021/024177, mailed Jun. 23, 2021.
International Search Report and Written Opinion for PCT/US2021/056708, mailed Jan. 27, 2022.
International Search Report and Written Opinion for PCT/US21/42061, mailed Nov. 26, 2021.
International Search Report and Written Opinion for PCT/US21/44532, mailed Jan. 11, 2022.
International Search Report and Written Opinion of PCT/US19/57305, mailed Jan. 2, 2020.
International Search Report and Written Opinion of PCT/US20/54117, mailed Dec. 22, 2020.
Joly, "Atmospheric Measurements by Ultra-Light Spectrometer (AMULSE) Dedicated to Vertical Profile In Situ Measurements of Carbon Dioxide ($CO_2$) Under Weather Balloons: Instrumental Development and Field Application," Sensors 2016, 16, 1609.
Khan, "Low Power Greenhouse Gas Sensors for Unmanned Aerial Vehicles", Remote Snse. 2012, 4, 1355-1368.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
"SAFESITE Multi-Threat Detection System", Jul. 11, 2012 (Jul. 11, 2012), pp. 1-6, XP055245980.
International Search Report and Written Opinion for PCT/US21/56710, mailed Feb. 23, 2022.
Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for $CO_2$ concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of $XCO_2$ and chlorophyll fluorescence from GOSAT, Geophysical Research Letters, vol. 40.2829-2833, doi: 10.1002/grl.50452, 2013 pp. 2829-2833 (Year:2013).
Queiber, Manuel et al., A new frontier in $CO_2$ flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial $CO_2$ anomalies with portable laser remote sensing and 2d tomography, The Leading Edge Mar. 2018, pp. 306-313 (Year:2018).
International Search Report and Written Opinion for PCT/US2023/023933 mailed Sep. 26, 2023.
International Search Report and Written Opinion for PCT/US23/23905 mailed Oct. 5, 2023.
Development of a mobile tracer correlation method for assessment of air emissions from landfills and other area sources, Atmospheric Environment 102 (2015) 323-330. T.A. Foster-Wittig et. al. 2015.
Measurements of Methane Emissions from Landfills Using a Time Correlation Tracer Method Based on FTIR Absorption Spectroscopy, Environ. Sci. Technol. 2001, 35, 21-25, B. Galle et. al. 2001.

(56) References Cited

OTHER PUBLICATIONS

Cabreira et al. "Survey on Coverage Path Planning with Unmanned Aerial Vehicles", published: Drones, published: Jan. 2019, pp. 1-38, year 2019.

Feng, Lingbing, Nowak, Gen, O'Neill, T.J., Welsh, A.H. "Cutoff; A spatio-temporal imputation method." Journal of Hydrology 519 (2014) : 3591-3605 (Year:2014).

* cited by examiner

OPTICAL CELL CLEANER

CROSS-REFERENCE TO RELATED APPLICATIONS

This application claims priority to and the benefit of U.S. Provisional Patent Application No. 62/955,536, filed Dec. 31, 2019, the contents of which are hereby incorporated by reference herein for all purposes.

TECHNICAL FIELD

Embodiments relate generally to cell optics, and more particularly to cleaning cell optics.

BACKGROUND

Methane (CH4) is an odorless and colorless naturally occurring organic molecule, which is present in the atmosphere at average ambient levels of approximately 1.85 ppm as of 2018 and is projected to continually climb. While methane is found globally in the atmosphere, a significant amount is collected or "produced" through anthropogenic processes including exploration, extraction, and distribution of petroleum in the form of natural gas. Natural gas, an odorless and colorless gas, is a primary source of energy used to produce electricity and heat. The main component of natural gas is methane (93.9 mol % CH4 typ.). While extraction of natural gas is a large source of methane released to atmosphere, major contributors of methane also include livestock farming (enteric fermentation), and solid waste and wastewater treatment (anaerobic digestion). Optical cells may be used to detect methane and other trace gasses.

SUMMARY

A system embodiment may include: an optical head enclosure of a sensor; one or more imbedded nozzles disposed on a surface of the optical head enclosure; an inlet of the one or more imbedded nozzles, where the inlet comprises a nozzle channel for receiving a cleaning solution; a flow channel internal to the optical head enclosure, where the nozzle channel may be connected to the flow channel, and where the flow channel comprises an outlet for dispersing the cleaning solution received from the nozzle channel; where the inlet may comprise a break to stop a nozzle of a cleaning device from reaching a mirror of the sensor; where the outlet may direct the cleaning solution from the inlet onto the mirror.

In additional system embodiments, the cleaning solution may be compressed air. In additional system embodiments, the cleaning solution may be a liquid. In additional system embodiments, the inlet may be disposed at an angle relative to the surface of the optical head enclosure. In additional system embodiments, the inlet may extend outward from the surface of the optical head enclosure. In additional system embodiments, a length or width of the outlet may be greater than a length or width of the nozzle channel.

In additional system embodiments, the break may be a change in angle between the nozzle channel and the flow channel. In additional system embodiments, the break may be a physical barrier between the nozzle channel and the flow channel. In additional system embodiments, the break may be a change in width or length between the nozzle channel and the flow channel.

In additional system embodiments, the sensor may be a trace-gas sensor. In additional system embodiments, the sensor may be an open path Herriot cell. In additional system embodiments, the nozzle of the cleaning device may be a straw.

A method embodiment may include: inserting a nozzle of a cleaning device into a nozzle channel of an inlet of one or more imbedded nozzles disposed on a surface of a optical head enclosure; and dispersing a cleaning solution from the cleaning device onto a mirror disposed within the optical head enclosure.

In additional method embodiments, the dispersed cleaning solution dusts the mirror. In additional method embodiments, the nozzle channel may be connected to a flow channel, where the flow channel may comprise an outlet for dispersing the cleaning solution received from the nozzle channel, and where the outlet may direct the cleaning solution from the inlet onto the mirror. In additional method embodiments, the inlet may comprise a break to stop the nozzle of the cleaning device from reaching the mirror.

A device embodiment may include an optical head enclosure of a sensor, comprising: an outer surface comprising one or more apertures for allowing ambient gas to enter the sensor disposed in the interior of the optical head enclosure; one or more imbedded nozzles disposed on an outer surface of the optical head enclosure; and an inlet of the one or more imbedded nozzles, wherein the inlet comprises a nozzle channel for receiving a cleaning solution to be directed toward the sensor disposed in the interior of the optical head enclosure.

Additional device embodiments may include: a flow channel connected to the nozzle channel, where the flow channel comprises an outlet for dispersing the cleaning solution received from the nozzle channel. In additional device embodiments, the outlet directs the cleaning solution from the inlet onto a mirror of the sensor. Additional device embodiments may include: a break disposed in the inlet to stop a nozzle of a cleaning device from reaching a mirror of the sensor.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

There exists a need to clean particulate matter that collects on sensitive optics within a trace gas sensor gently and noninvasively. The trace gas sensor may include one or more mirrors, such as in an open path Herriot cell optics. The reflective surface of the mirrors may be easily scratched by foreign bodies. Cleaning the mirrors in an external environment, such as an oil field, is challenging.

In the disclosed system and method, compressed air may be used to "dust" the mirrors and remove accumulated particulates from the reflective surface of the mirrors. By imbedding a nozzle within the housing of the optical head, particulate matter can be removed quickly and easily while minimizing the risk of damaging the reflective surface of the mirrors. An imbedded nozzle may be built into a sidewall of the optical head enclosure. The imbedded nozzle may channel allow the airflow to be directed towards the mirror surface at an optimal angle for maximizing dust removal. This optimal angle may vary based on the dimensions of the optical cell, mirrors, housing, or the like. This imbedded nozzle serves dual purposes. The imbedded nozzle channels airflow from the compressed air canister towards the mirror or reflective surface. The imbedded surface also prevents a straw from the canister from becoming a projectile that may scratch the mirror's reflective surface.

Figure 1:
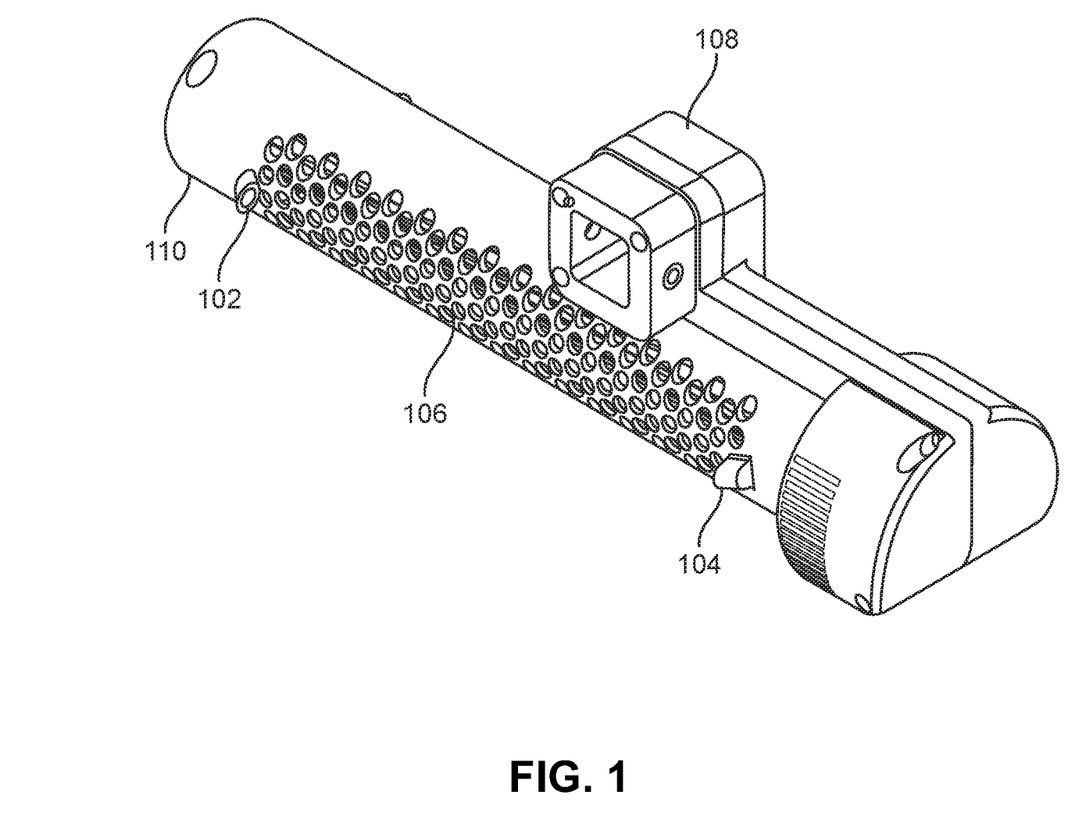
FIG. 1 depicts an optical head enclosure with one or more imbedded nozzles, according to one embodiment.
Figure 9:
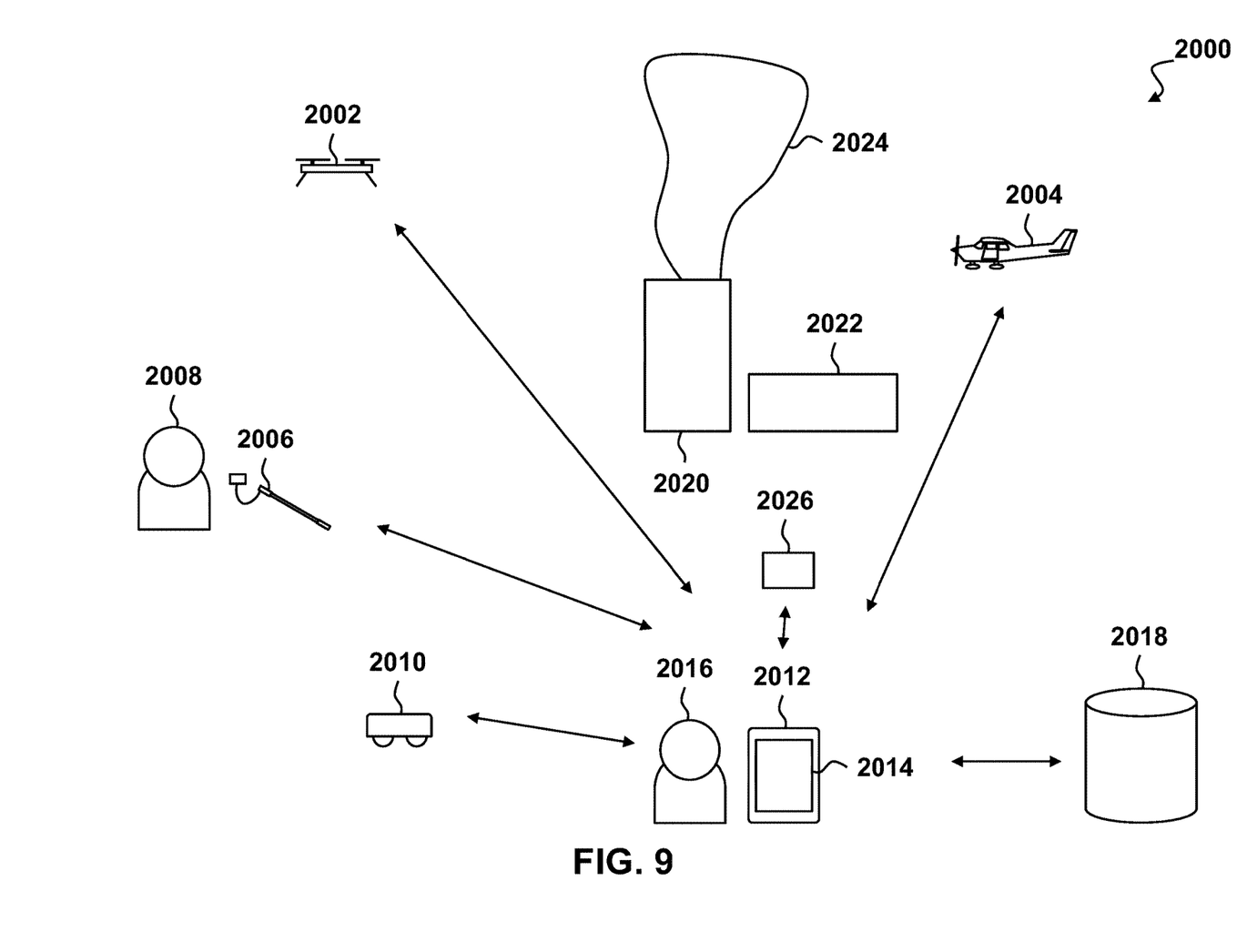
FIG. 9 depicts a system for detecting trace gasses with the disclosed gas sensor, according to one embodiment.

FIG. 1 depicts an optical head enclosure 100 with one or more imbedded nozzles 102, 104, according to one embodiment. The optical head enclosure 100 may contain a sensor, such as a trace-gas sensor. In some embodiment, the sensor may be an open path Herriot cell. The surface 110 of the optical head enclosure 100 may include one or more apertures 106 or openings for allowing ambient gas to enter the sensor disposed in the interior of the optical head enclosure 100. During use, such as in an oil field, the optics of the sensor may become dirty, covered with dust, or the like. Dust may impede the accuracy of the sensor to detect trace-gasses. Regular cleaning of the optics of the sensor may ensure that the trace-gas detection is accurate and allow for prolonged use of the sensor. The optical head enclosure 100 may be attached to a handle, aerial vehicle, unmanned aerial vehicle (UAV), or the like, such as shown in FIG. 9, via one or more enclosure attachments 108. One or more imbedded nozzles 102, 104 may be disposed on and through the surface of the optical head enclosure 100 to allow for cleaning of the optics of the sensor within the optical head enclosure 100.

Figure 2:
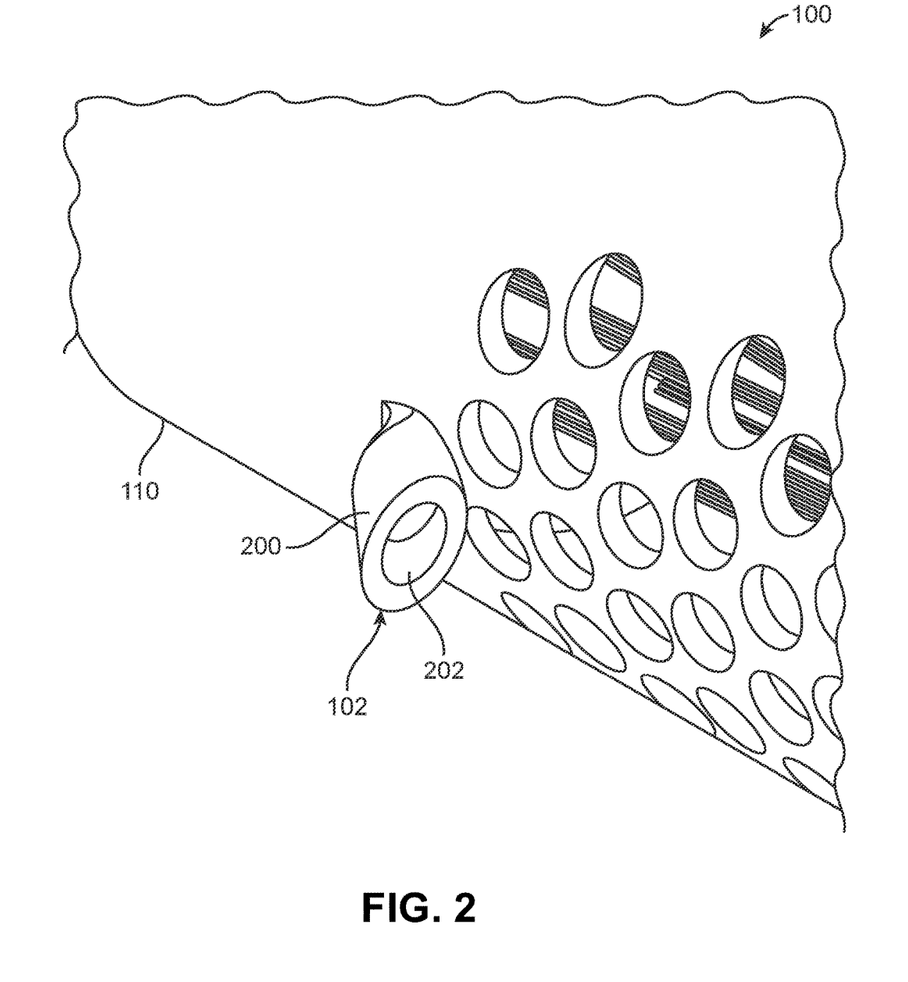
FIG. 2 depicts a close-up view of an imbedded nozzle on a surface of the optical head enclosure of FIG. 1, according to one embodiment.
Figure 7:
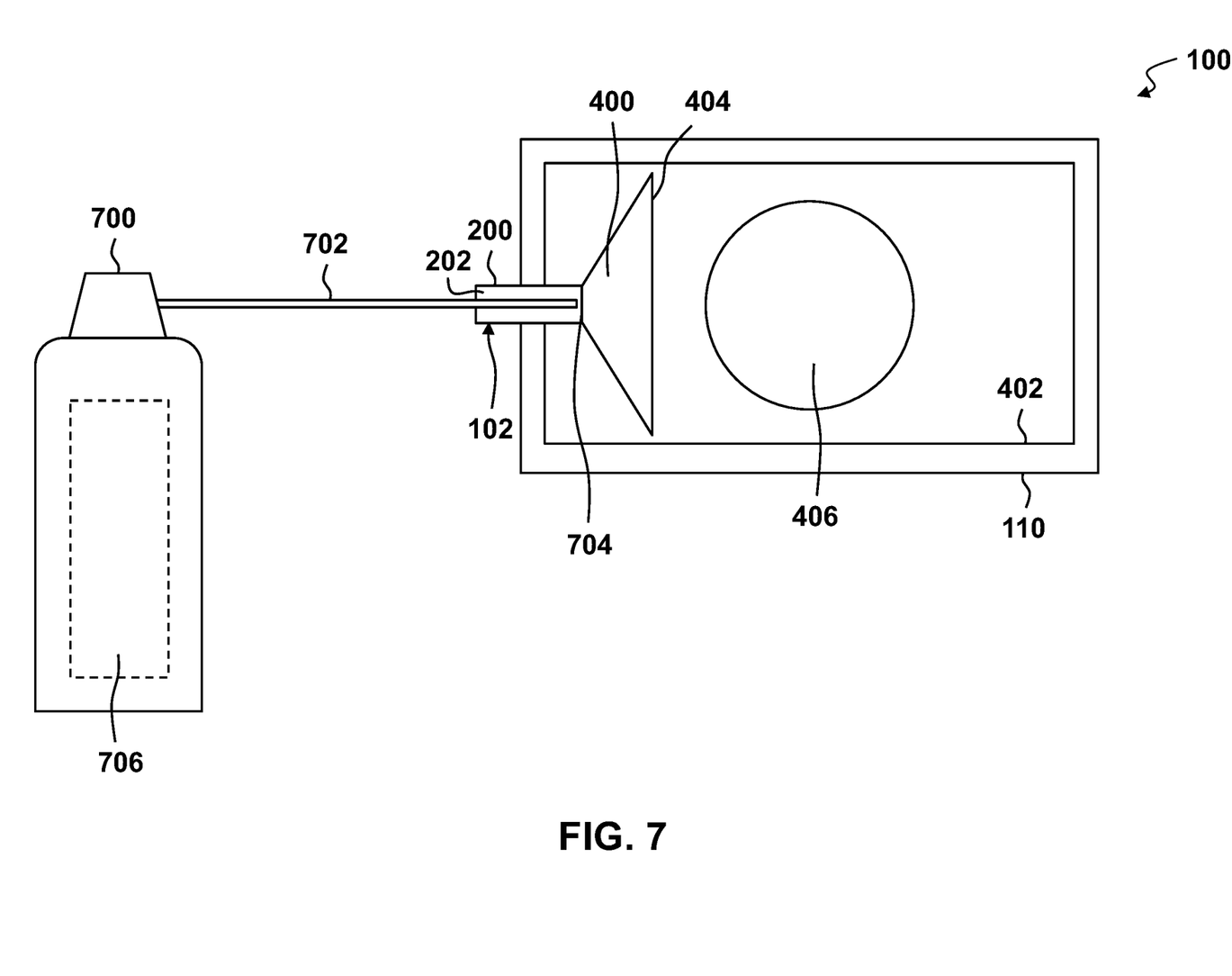
FIG. 7 depicts a cleaning device for dusting a mirror of an optical head enclosure, according to one embodiment.

FIG. 2 depicts a close-up view of an imbedded nozzle 102 on a surface 110 of the optical head enclosure 100 of FIG. 1, according to one embodiment. The imbedded nozzle 102 includes an inlet 200. The inlet 200 may be a portion that extends outward from the outer surface 110 of the optical head enclosure 100. The inlet 200 may be disposed at an angle relative to the surface 100 of the optical head enclosure 100 in some embodiments. The inlet 200 may include a nozzle channel 202 for receiving a nozzle of a cleaning device and/or a cleaning solution from the cleaning device. The nozzle channel 202 may be sized to receive a nozzle from a cleaning device, such as shown in FIG. 7.

Figure 3:
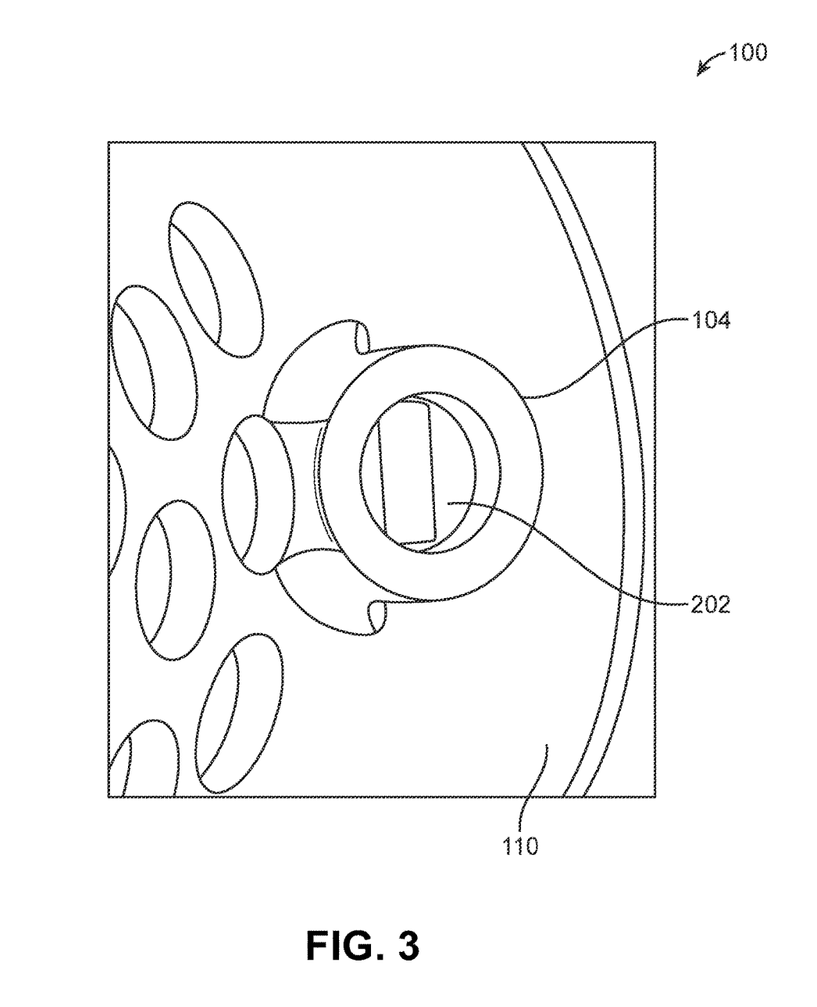
FIG. 3 depicts a close-up view of a nozzle channel on the optical head enclosure, according to one embodiment.

FIG. 3 depicts a close-up view of a nozzle channel 202 on the optical head enclosure 100, according to one embodiment. Each imbedded nozzle 104 may include the nozzle channel 202 extending from the surface 110 of the optical head enclosure 100.

Figure 4:
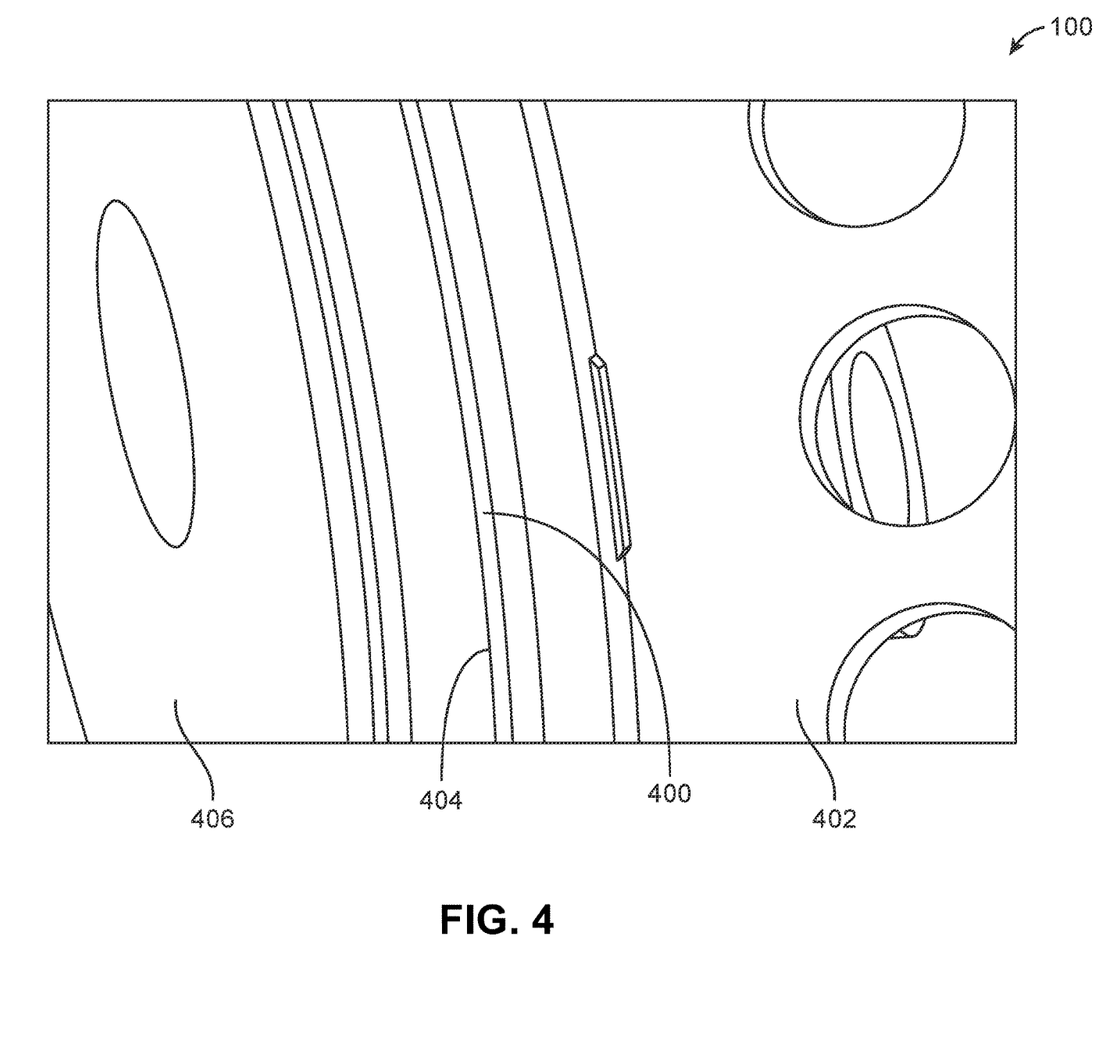
FIG. 4 depicts an airflow channel internal to the optical head enclosure, according to one embodiment.

FIG. 4 depicts an airflow channel 400 internal to the optical head enclosure 100, according to one embodiment. The flow channel 400 may be connected to the nozzle channel 202 to transfer a cleaning solution from the cleaning device, through the nozzle, to the nozzle channel, through the flow channel 400, through an outlet 404 of the flow channel 400, and onto a mirror 406. An inner surface 402 of the optical head enclosure 100 may contain a portion of the nozzle channel 202, the flow channel 400, and outlet 404, in some embodiments.

Figure 5:
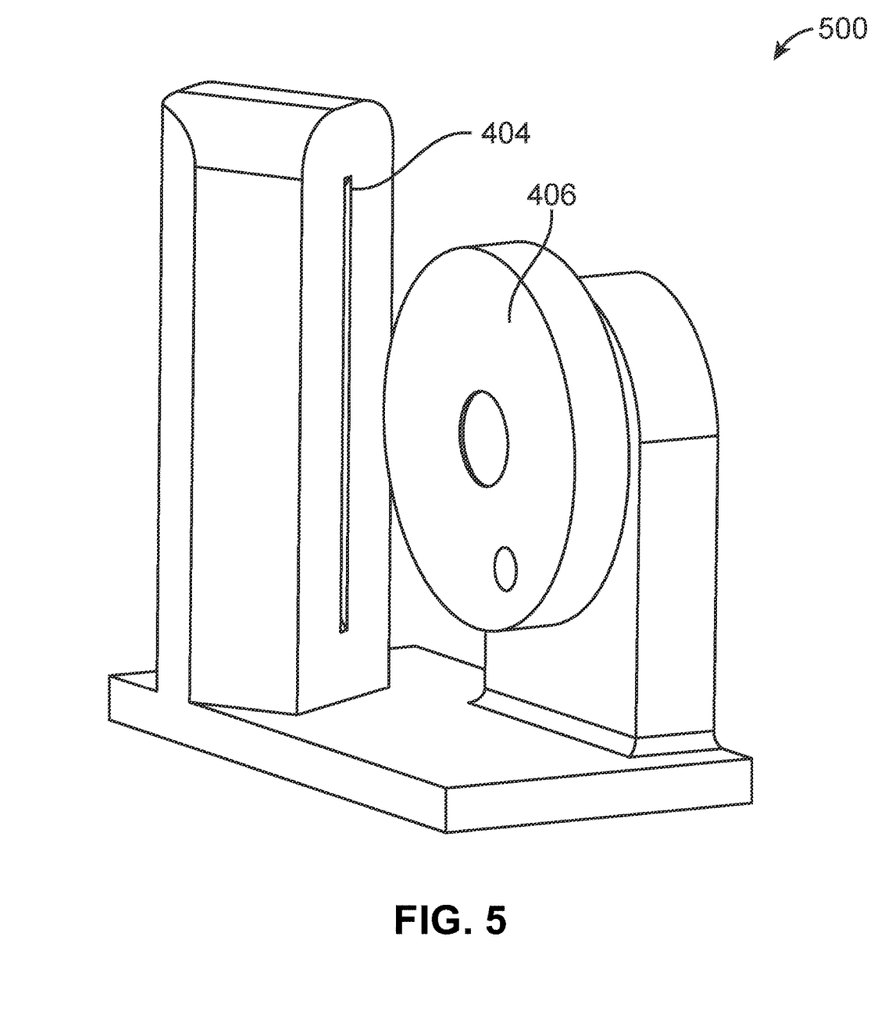
FIG. 5 depicts a fixture for dusting of a mirror of a sensor showing the air outlet, according to one embodiment.

FIG. 5 depicts a fixture 500 for dusting of a mirror 406 of a sensor showing the air outlet 404, according to one embodiment. The cleaning solution may exit the outlet 404 and be dispersed onto the mirror 406. The dimensions of the outlet 404, position of the outlet 404 relative to the mirror, and other dimensions may be varied based on the size of the mirror 406, amount of dust on the mirror 406, cleaning frequency, and the like.

Figure 6:
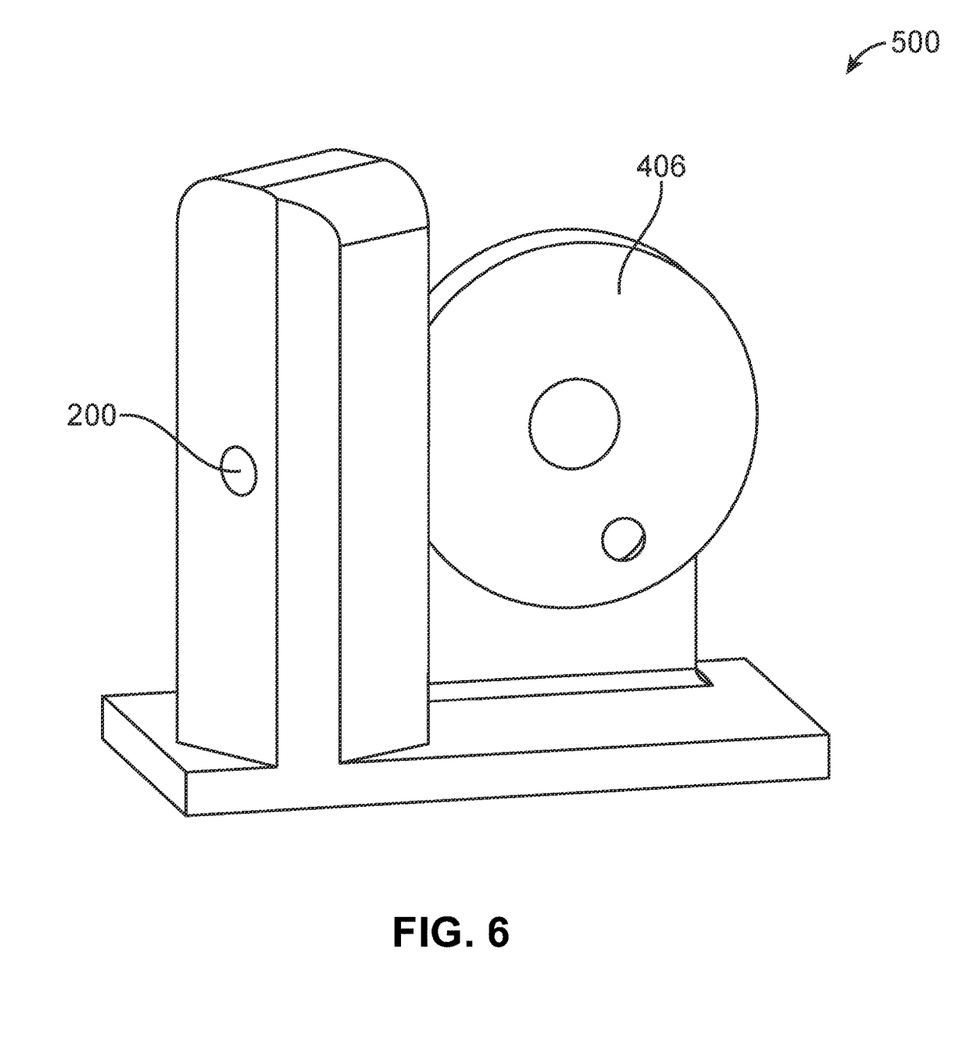
FIG. 6 depicts the fixture of FIG. 5 for dusting of the mirror of the sensor showing the air inlet, according to one embodiment.

FIG. 6 depicts the fixture 500 of FIG. 5 for dusting of the mirror of the sensor 500 showing the air inlet 200, according to one embodiment. The inlet 200 may receive the nozzle of the cleaning device.

FIG. 7 depicts a cleaning device 700 for dusting a mirror 406 of an optical head enclosure 100, according to one embodiment. The optical head enclosure 100 of the sensor may include one or more imbedded nozzles 102 disposed on a surface 110 of the optical head enclosure. The inlet 200 of the one or more imbedded nozzles 102 may include the nozzle channel 202 for receiving a cleaning solution 706 from a nozzle 702 of a cleaning device 700. In some embodiments, the cleaning solution 706 may be compressed air. In other embodiments, the cleaning solution 706 may be a liquid. In other embodiments, the cleaning solution 706 may be any gas, such as fluorocarbons. In some embodiments, the cleaning device 700 may be a compressed air canister. The nozzle 702 may be a straw in some embodiments. The inlet 202 may be sized to receive the nozzle 702.

The flow channel 400 may be internal to the optical head enclosure 100. In some embodiments, at least a portion of the flow channel 400 may be disposed between the outer surface 110 and inner surface 402 of the optical head enclosure 100. The nozzle channel 202 may be connected to the flow channel 400. The flow channel 400 may include the outlet 404 for dispersing the cleaning solution 706 received from the nozzle channel 202. The outlet 404 may direct the cleaning solution 706 from the inlet 202 onto the mirror 406. A length or width of the outlet 404 may be greater than a length or width of the nozzle channel 202.

The inlet 200 may include a break 704 to stop the nozzle 702 of the cleaning device 700 from reaching a mirror 406 of the sensor. The break 704 allows a user in the field, such as an oil field, to dust the mirror 406 of the sensor without risk of accidentally scratching the mirror 406 by contacting the mirror with the nozzle 702 of the cleaning device. The break 704 may be a change in angle between the nozzle channel 202 and the flow channel 400. The break 704 may be a physical barrier between the nozzle channel 202 and the flow channel 400. The break 704 may be a change in width or length between the nozzle channel 202 and the flow channel 400. The change in width or length between the nozzle channel 202 and the flow channel 400 may be such as to prevent the nozzle 702 of the cleaning device 700 from extending past the break 704 and into the flow channel 400.

Figure 8:
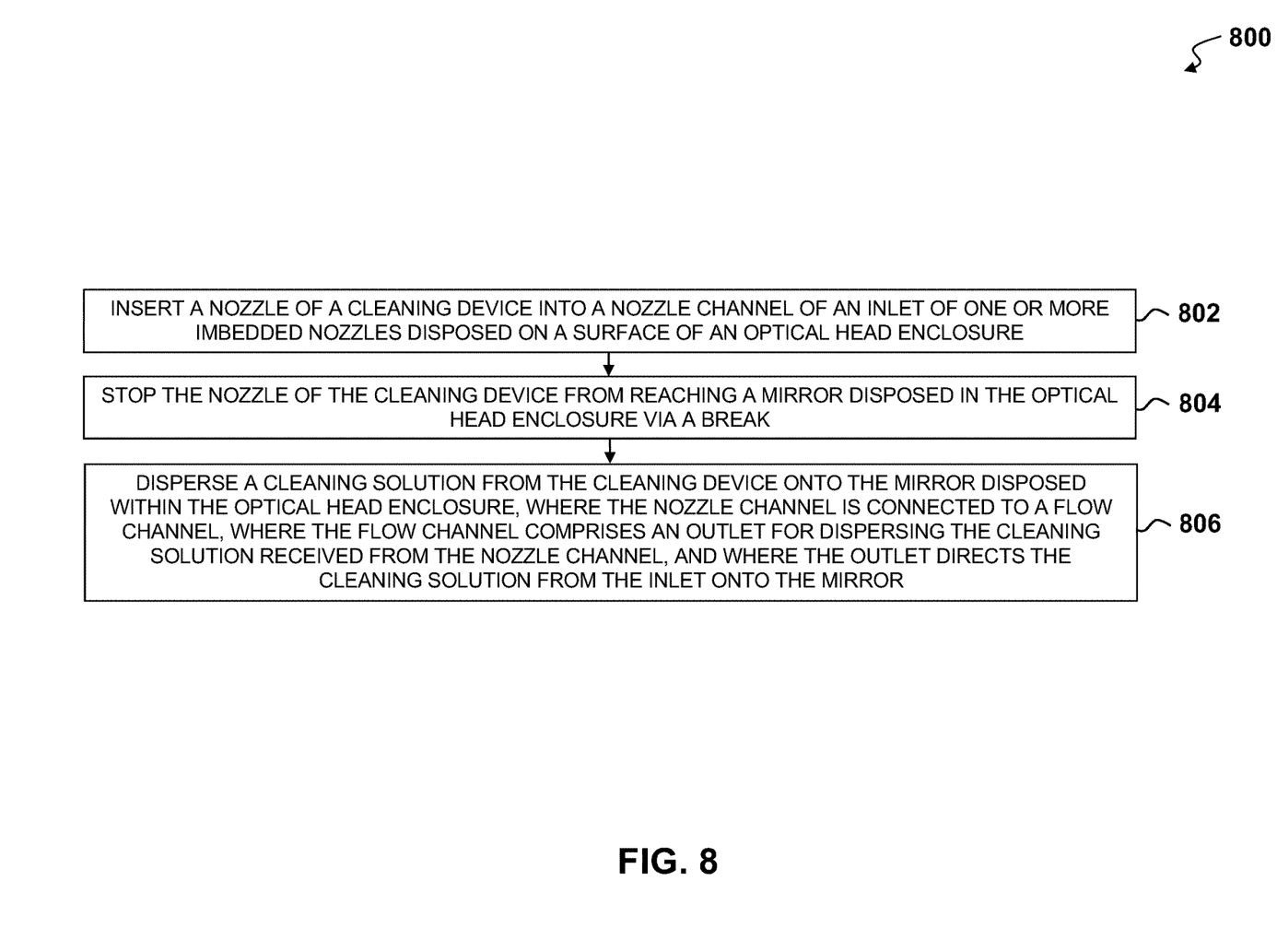
FIG. 8 depicts a high-level flowchart of a method embodiment for dusting a mirror of a sensor, according to one embodiment.

FIG. 8 depicts a high-level flowchart of a method embodiment 800 for dusting a mirror of a sensor, according to one embodiment. The method 800 may include inserting a nozzle of a cleaning device into a nozzle channel of an inlet of one or more imbedded nozzles disposed on a surface of a optical head enclosure (step 802). The method 800 may then include stopping the nozzle of cleaning device from reaching a mirror disposed in the optical head enclosure via a break (step 804). The method 800 may then include dispersing a cleaning solution from the cleaning device onto the mirror disposed within the optical head enclosure (step 806). The nozzle channel may be connected to a flow channel. The flow channel may include an outlet for dispersing the cleaning solution received from the nozzle channel. The outlet may direct the cleaning solution from the inlet onto the mirror.

FIG. 9 depicts a system 2000 for detecting trace gasses utilizing the disclosed gas sensor, according to one embodiment. The use of these trace gas sensors may expose the trace gas sensors to dirt, dust, or other contaminants that should be removed using the system and method disclosed herein. The system may include one or more trace gas sensors located in one or more vehicles 2002, 2004, 2006, 2010. The one or more trace gas sensors may detect elevated trace gas concentrations from one or more potential gas sources 2020, 2022, such as a holding tank, pipeline, or the like. The potential gas sources 2020, 2022 may be part of a large facility, a small facility, or any location. The potential gas sources 2020, 2022 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as SO, SO2, SO3, S7O2, S6O2, S2O2, and the like. A trace gas leak 2024 may be present in a potential gas source 2020. The one or more trace gas sensors may be used to identify the trace gas leak 2024 and/or the source 2020 of the trace gas leak 2024 so that corrective action may be taken.

The one or more vehicles 2002, 2004, 2006, 2010 may include an unmanned aerial vehicle (UAV) 2002, an aerial vehicle 2004, a handheld device 2006, and a ground vehicle 2010. In some embodiments, the UAV 2002 may be a quadcopter or other device capable of hovering, making sharp turns, and the like. In other embodiments, the UAV 2002 may be a winged aerial vehicle capable of extended flight time between missions. The UAV 2002 may be autonomous or semi-autonomous in some embodiments. In other embodiments, the UAV 2002 may be manually controlled by a user. The aerial vehicle 2004 may be a manned vehicle in some embodiments. The handheld device 2006 may be any device having one or more trace gas sensors operated by a user 2008. In one embodiment, the handheld device 2006 may have an extension for keeping the one or more trace gas sensors at a distance from the user 2008. The ground vehicle 2010 may have wheels, tracks, and/or treads in one embodiment. In other embodiments, the ground vehicle 2010 may be a legged robot. In some embodiments, the ground vehicle 2010 may be used as a base station for one or more UAVs 2002. In some embodiments, one or more aerial devices, such as the UAV 2002, a balloon, or the like, may be tethered to the ground vehicle 2010. In some embodiments, one or more trace gas sensors may be located in one or more stationary monitoring devices 2026. The one or more stationary monitoring devices may be located proximate one or more potential gas sources 2020, 2022. In some embodiments, the one or more stationary monitoring devices may be relocated.

The one or more vehicles 2002, 2004, 2006, 2010 and/or stationary monitoring devices 2026 may transmit data including trace gas data to a ground control station (GCS) 2012. The GCS may include a display 2014 for displaying the trace gas concentrations to a GCS user 2016. The GCS user 2016 may be able to take corrective action if a gas leak 2024 is detected, such as by ordering a repair of the source 2020 of the trace gas leak. The GCS user 2016 may be able to control movement of the one or more vehicles 2002, 2004, 2006, 2010 in order to confirm a presence of a trace gas leak in some embodiments.

In some embodiments, the GCS 2012 may transmit data to a cloud server 2018. In some embodiments, the cloud server 2018 may perform additional processing on the data. In some embodiments, the cloud server 2018 may provide third party data to the GCS 2012, such as wind speed, temperature, pressure, weather data, or the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   an optical head enclosure including an outer surface that has a wall surrounding a sensor and comprising one or more apertures formed thereon, wherein the sensor includes an open path with a first mirror and a second mirror disposed at each end of the open path;
   one or more imbedded nozzles that penetrate through and are imbedded in the outer surface of the optical head enclosure and disposed between the first mirror and the second mirror inside the outer surface of the optical head enclosure, wherein at least one of the one or more imbedded nozzles is disposed closer to the first mirror than the second mirror;
   an inlet of each of the one or more imbedded nozzles, wherein the inlet comprises a nozzle channel for receiving a cleaning solution;
   a flow channel internal to the optical head enclosure, wherein the nozzle channel is connected to the flow channel, and wherein the flow channel comprises an outlet for dispersing the cleaning solution received from the nozzle channel;
   a break disposed in the inlet to stop a nozzle of a cleaning device from reaching the first mirror of the sensor;
   wherein the outlet directs the cleaning solution from the inlet onto the first mirror.

2. The system of claim 1, wherein the cleaning solution is at least one of: compressed air and a liquid.

3. The system of claim 1, wherein the wall is a cylindrical wall.

4. The system of claim 1, wherein the inlet is disposed at an angle relative to the surface of the optical head enclosure.

5. The system of claim 1, wherein the inlet extends outward from the surface of the optical head enclosure.

6. The system of claim 1, wherein a length or width of the outlet is greater than a length or width of the nozzle channel.

7. The system of claim 1, wherein the break is at least one of: a change in angle between the nozzle channel and the flow channel, and a change in width or length between the nozzle channel and the flow channel.

8. The system of claim 1, wherein the break is a physical barrier between the nozzle channel and the flow channel.

9. The system of claim 1, wherein the flow channel widens as it approaches the outlet.

10. The system of claim 1, wherein the sensor is a trace-gas sensor.

11. The system of claim 1, wherein the sensor is an open path Herriot cell.

12. The system of claim 1, wherein the nozzle of the cleaning device is a straw.

13. A method comprising:
    preparing a system comprising an optical head enclosure including an outer surface that has a wall surrounding a sensor and comprises one or more apertures formed thereon, and one or more imbedded nozzles that penetrate through and are imbedded in the outer surface of the optical head enclosure;
    inserting a nozzle of a cleaning device into a nozzle channel of an inlet of the one or more imbedded nozzles, wherein the sensor includes an open path with a first mirror and a second mirror disposed at each end of the open path, wherein the inlet is disposed between the first mirror and the second mirror, and wherein the inlet of the one or more imbedded nozzles is disposed closer to the first mirror than the second mirror; and
    dispersing a cleaning solution from the cleaning device onto the first mirror disposed within the optical head enclosure.

14. The method of claim 13, wherein the dispersed cleaning solution dusts the first mirror, and wherein the wall is a cylindrical wall.

15. The method of claim 13, wherein the nozzle channel is connected to a flow channel, wherein the flow channel comprises an outlet for dispersing the cleaning solution received from the nozzle channel, wherein the outlet directs the cleaning solution from the inlet onto the first mirror, and wherein the flow channel widens as it approaches the outlet.

16. The method of claim 13, wherein the inlet comprises a break to stop the nozzle of the cleaning device from reaching the first mirror.

17. An optical head enclosure of a sensor, comprising:
    an outer surface having a wall surrounding a sensor and comprising one or more apertures formed thereon for allowing ambient gas to enter the sensor disposed in the interior of the optical head enclosure, wherein the sensor includes an open path with a first mirror and a second mirror disposed at each end of the open path;
    one or more imbedded nozzles that penetrate through and are imbedded in the outer surface and that are disposed inside the outer surface of the optical head enclosure, wherein at least one of the one or more imbedded nozzles is disposed between the first mirror and the second mirror, and wherein at least one of the one or more imbedded nozzles is disposed closer to the first mirror than the second mirror; and
    an inlet of each of the one or more imbedded nozzles, wherein the inlet comprises a nozzle channel for receiving a cleaning solution to be directed toward the first mirror of the sensor disposed in the interior of the optical head enclosure.

18. The optical head enclosure of the sensor of claim 17, further comprising:
    a flow channel connected to the nozzle channel, wherein the flow channel comprises an outlet for dispersing the cleaning solution received from the nozzle channel, and wherein the flow channel widens as it approaches the outlet.

19. The optical head enclosure of the sensor of claim 18, wherein the outlet directs the cleaning solution from the inlet onto the first mirror of the sensor, and wherein the wall is a cylindrical wall.

20. The optical head enclosure of the sensor of claim 18, further comprising:
    a break disposed in the inlet to stop a nozzle of a cleaning device from reaching the first mirror of the sensor.

\* \* \* \* \*